United States Patent
Bartha et al.

(10) Patent No.: US 11,555,144 B2
(45) Date of Patent: Jan. 17, 2023

(54) COLLOIDAL DISPERSE SYSTEM SUITABLE FOR PHASE INVERSION TO STIMULATE HYDROCARBON PRODUCTION WELLS

(71) Applicant: MOL MAGYAR OLAJ—És GÁZIPARI NYILVÁNOSAN MŰKÖDŐ RÉSZVÉNYTÁRSASÁG, Budapest (HU)

(72) Inventors: László Bartha, Veszprém (HU); Roland Nagy, Sóly (HU); Árpád Vágó, Kiskunhalas (HU); István János Lakatos, Miskolc (HU); Gabriella Szentes, Somogyjád (HU); Zsuzsa Karaffa, Budapest (HU)

(73) Assignee: MOL Magyar Olaj- és Gázipari Nyilvánosan Működő Részvénytársaság, Budapest (HU)

( * ) Notice: Subject to any disclaimer, the term of this patent is extended or adjusted under 35 U.S.C. 154(b) by 23 days.

(21) Appl. No.: 17/415,837

(22) PCT Filed: Dec. 18, 2019

(86) PCT No.: PCT/HU2019/050058
§ 371 (c)(1),
(2) Date: Jun. 18, 2021

(87) PCT Pub. No.: WO2020/128545
PCT Pub. Date: Jun. 25, 2020

(65) Prior Publication Data
US 2022/0073811 A1    Mar. 10, 2022

(30) Foreign Application Priority Data

Dec. 19, 2018 (HU) .................................. P1800435
May 8, 2019 (HU) .................................. P1900145

(51) Int. Cl.
  *C09K 8/60*   (2006.01)
  *C09K 8/82*   (2006.01)
  *E21B 43/20*  (2006.01)

(52) U.S. Cl.
  CPC ................ *C09K 8/602* (2013.01); *C09K 8/82* (2013.01); *E21B 43/20* (2013.01)

(58) Field of Classification Search
  CPC ........................................................ C09K 8/00
  See application file for complete search history.

(56) References Cited

U.S. PATENT DOCUMENTS 4,498,539 A   2/1985 Bruning
5,888,944 A   3/1999 Patel
(Continued)

FOREIGN PATENT DOCUMENTS

CN   106833564 A     6/2017
WO   2016/033533 A1  3/2016

OTHER PUBLICATIONS

Bai et al.: "A comprehensive review of polyacrylamide polymer gels for conformance control", Petrol. Explor. Develop., 2015, vol. 42, iss. 4, pp. 525-532.
(Continued)

*Primary Examiner* — Angela M DiTrani Leff
*Assistant Examiner* — Avi T Skaist
(74) *Attorney, Agent, or Firm* — Jason D. Voight (57) ABSTRACT

The present invention relates to a colloidal composition for stimulating the operation of high water-yield, natural gas, or petroleum-producing wells, which, when mixed with the water, forms a structured high viscosity barrier to exclude the water and to reduce the water/hydrocarbon volume proportion of the production, furthermore, at the time of use, in the proximity of the wells the residual oil sorbed on the surface of the hydrocarbon reservoir and/or the residual oil
(Continued)

trapped in the pores of the hydrocarbon reservoir becomes compressible and recoverable. The colloidal composition comprises a vegetable oil reaction product based compound. Experiments with the new composition have demonstrated that it can be successfully used in a much wider range of parameters than before to form a barrier resulting in water displacement, as well as to mobilize and recover residual oil adhering to the well area.

16 Claims, 4 Drawing Sheets

(56) References Cited

U.S. PATENT DOCUMENTS

| | | |
|---|---|---|
| 7,226,896 B2 | 6/2007 | Audibert-Hayet et al. |
| 7,458,424 B2 | 12/2008 | Odeh et al. |
| 7,727,938 B2 | 6/2010 | Ballard |
| 9,074,125 B1 | 7/2015 | Lahalih |
| 2007/0021636 A1 | 1/2007 | Bosch |
| 2017/0190956 A1 | 7/2017 | Beach et al. |
| 2018/0320060 A1* | 11/2018 | Holtsclaw .............. C09K 8/602 |
| 2019/0194526 A1 | 6/2019 | Holtsclaw et al. |

OTHER PUBLICATIONS

Verdinelli et al.: "Hydrophile-lipophile balance (HLB) of n-alkane phosphonic acids and theirs salts", Colloids and Surfaces A: Physicochem. Eng. Aspects, 2008, vol. 316, pp. 131-135.

Vadászi et al.: "Metastabilis Mikroemulziók Áramlási Sajátságai Porózus Közegben", Műszaki Földtudományi Közlemények, 2015, vol. 85, No. 1, pp. 247-253.

Ming Han et al.: "State-of-the-Art of In-Depth Fluid Diversion Technology: Enhancing Reservoir Oil Recovery by Gel Treatments", SPE Saudi Arabia Section Technical Symposium and Exhibition, 2014, pp. 1-10.

* cited by examiner

1. ábra:

2. ábra:

COLLOIDAL DISPERSE SYSTEM SUITABLE FOR PHASE INVERSION TO STIMULATE HYDROCARBON PRODUCTION WELLS

This is the national stage of International Application PCT/HU2019/050058, filed Dec. 18, 2019.

DESCRIPTION OF THE STATE OF THE ART

The present invention relates to a colloidal composition for stimulating the operation of high water-yield, natural gas, or petroleum-producing wells, which, when mixed with the water, forms a structured high viscosity barrier to exclude the water and to reduce the water/hydrocarbon volume proportion of the production, furthermore, at the time of use, in the proximity of the wells the residual oil sorbed on the surface of the hydrocarbon reservoir and/or the residual oil trapped in the pores of the hydrocarbon reservoir becomes compressible and recoverable.

The recovery of petroleum and natural gas, displacement from porous and fractured systems is achieved by replacing the hydrocarbon phase with water. The active element of the so-called water displacement mechanism is the phase change generated by gravitational and hydrodynamic forces. Therefore, water breakthrough and continuous water production are necessary in the process after the initial phase of the production period. The water breakthrough comes from the lower body of the reservoirs (cone formation), from the perimeter water inflow as a natural process, and from deliberate water injection (layer energy maintenance) and water liquidation (environmental protection solution), but the tendency of water production highly depends structure of the reservoir, heterogeneity, permeability contrast, etc. too. In order to reduce the water content of the recovered material, the aim is to reduce the inflow of less mobile water in gas storage systems (gas fields and underground gas storage). It is generally believed that the reduction of water production in the production wells and indirectly in the vicinity of the water injection wells is the equalization of the flow profiles, which, in principle and practically, is classified as a reservoir conformance control. The purpose of these operations is to improve the production characteristics of the wells, to increase the pore space affected by the flow in the well-area zone (increase in volume efficiency) and to delay the water breakthrough and, ultimately, to reduce the water inflow. The harmful effects of a high proportion of water have long been recognized by those skilled in the art. Many methods have been elaborated to remedy this problem over the past half century. Reviewing the literature and patents, it can be found that nearly 80% of the known methods elaborated for reducing the water yield of production wells were based on the in situ generation of water soluble polymer gels. In their application, high viscosity gels formed under layer conditions were used to partially or completely exclude high permeability channels. Individual compounds suitable for the formation of various gel structures are usually pressed into the wells in the form of their aqueous solutions, whereby, at the temperature and pressure of the given layer, as a result of delayed gel formation processes, the gel structure inhibiting the inflow of water is formed.

The distance of gel formation from the treated well was controlled by the rate, essentially the duration, of gel formation. The gel barrier thus closes the flow of water through the large pore channels, but does not restrict the flow of small hydrocarbons through small pores, predominantly oil-wet channels, which are blocked from the aqueous gel forming components, thereby significantly reducing the volume or weight ratio of the produced water/hydrocarbons mixed phase material flow.

Over the past decades, many variants of water displacement processes and suitable gelling agents have been patented.

Based on the type of economically usable gel-forming components and the known manner in which the gel was formed, several typical development directions of the processes could be identified. The common feature of the different methods variable in their technological solutions and used chemicals is that the wells were treated with aqueous solutions and a gel in an aqueous medium was formed in the reservoirs. Depending on the amount of solution injected, a shallow and deep penetration barrier is formed, furthermore, a treatment solution with different composition is used in porous and fractured systems in order to reduce water inflow. The interest in using barrier-forming technologies based on water-soluble monomers and polymers has recently declined significantly, although hydrocarbon production has increasingly shifted to partially cultivated fields, i.e. to fields cultivated with a high proportion of water. This is due to the tightening of environmental regulations and the banning of many widely used chemicals by the REACH regulations.

In case of one common type of process, a post-polymerizable solution of an anionic or cationic water-soluble polymer, such as an aqueous solution of a low molecular weight polyacrylate, polyvinyl alcohol, or polyamide, is injected as a gel-forming component into a barrier layer (U.S. Pat. No. 9,074,125 B1). Then, for subsequent cross-linking, polyvalent metal salts capable of linking polymer chains, such as aqueous solutions of $Cr'$ salts or Ca salts, or Al citrate or dimethyl urea, or reactive coupling agents such as polyethyleneimine or complexing agents, aqueous solutions of phenol-formaldehyde or urea or formaldehyde resins were pressed into the storage layer, where they were mixed with the polymer solution and then at a given temperature at pH adjusted with inorganic or organic acids the post-polymerization reactions had been performed (U.S. Pat. Nos. 6,174,413, 4,498,539). These gel-forming materials have the disadvantage that they usually contain toxic, water-soluble components and thus pose an environmental risk.

Another major group of gel forming components used are silicon compounds, which in their polyacrylamide-containing solutions are introduced into the storage layer to be treated, to which aqueous solutions containing $CaCl_2$) or biopolymers or other compounds containing multiple polar groups, such as polyols, resorcinol, furthermore, formaldehyde, ethylene-diamine, piperazine are the subsequently injected, to catalyze the gel-forming reactions. 0.5-3.0% of an activator compound, such as an aqueous solution of N,N'-dimethylurea disclosed in U.S. Pat. No. 7,458,424 B2, may be used to promote gel formation. The disadvantages of the processes are that the gel formation process is sensitive to many parameters, such as the concentration of reagents, the temperature of storage layer, the composition of bed water and its pH changes, which limit the reproducibility of the resulting gel properties. According to U.S. Pat. No. 9,074,125 B1, strong or weak acids, such as boric acid or acetic acid, were used to adjust the optimum pH for the crosslinking.

Another disadvantage of the processes using water-soluble polymers is that they exhibit significant adsorption on the water-wet surface of sandstone- or limestone-based reservoirs, which adversely reduces the hydrocarbon permeability of the pores of the storage rocks and the gel-forming polymer content of the treatment liquid (B. Bai, J. Chon, M. Yin. A comprehensive review of polyacrylamide polymer gels for conformance control). From their aqueous treatment solutions with lower polymer content, only gels with lower mechanical strength and thermal stability are formed. They also have the disadvantage that the formation process and the duration of the gel formation can only be influenced by a narrow range of inorganic salts and pH. Due to the low viscosity of the aqueous solution, the treatment fluid can completely penetrate the pores of the low permeability hydrocarbon formation rock, which are blocked during the crosslinking process, thus completely preventing the flow of natural gas or low carbon hydrocarbons. During the subsequent gel forming operations using conventional metal salts, the concentration of the various Ca, Cr, Zr, Si, Na, K salts increase in the storage layer, said salts are both expensive, at the same time cause significant environmental contamination. The gels formed are difficult or impossible to break down. Analyzing the failed field pilots shows that in many cases, the gel formulation mechanism according to the chemical formulation worked with 100% safety under layer conditions, but injecting or placing liquids in the target area was problematic.

Figure 3:
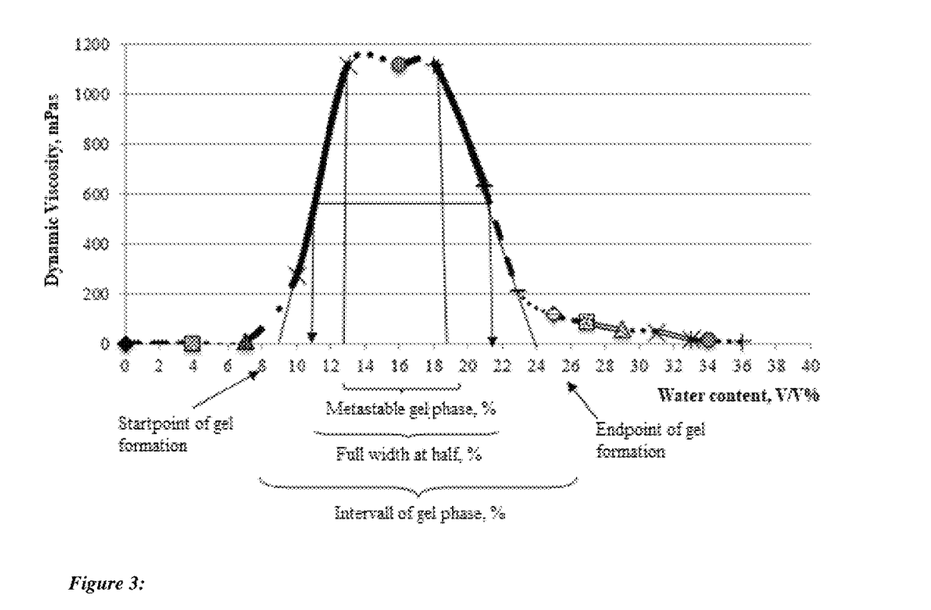
FIG. 3: Determination of the phase inversion range using the representative viscosities of a hydrostructured, high-viscosity barrier as a function of water content

A further development direction of materials that can be used to make waterproofing barriers has been the production and use of in-situ organic hydrogels in the storage layer. MOL Plc. and its research partners in the last decade have developed a colloidal dispersion system suitable for phase inversion, containing a refined petroleum medium distillate and anionic and non-ionic surfactants, to achieve water exclusion in wet gas wells, which, when injected into the storage layer and mixed with the bed water, formed a microemulsion and then a structured, high viscosity barrier (e.g., hydrogel) (FIGS. 1 and 2). The dynamic viscosity of the structured high viscosity barriers having a water content of 5 to 30% by weight, formed from the barrier forming composition, according to new example P-15, reached 1000-10000 mPa*s range in the phase inversion range. As shown in FIG. 3, the characteristics of the viscosity curve determined by continuous titration in the phase inversion range can serve as a basis for determining the physical properties of the barrier, characterizing the stability of the method under given reservoir conditions, and developing a new patentable composition. Following the development of a well treatment procedure adopted for the application of the new product, the practical application of the previous composition allowed the natural gas/bed water volume flow rate to be increased from 0.25 to 0.80 (mean boepm/bblpm value at 3 months post-treatment). In addition, the residual oil saturation has been mobilized for gas cap oil storage layers, so that after the treatment a significant amount of liquid hydrocarbon production has been recorded in half of the gas wells put into production. Despite the remarkable successes in the field, the pilot applications of the technology have also pointed out that the method is limited in scope and has serious limitations in both storage engineering and in chemistry, meaning that further development of the process is more than justified.

The practical application of the so-called self-assembled organic-based gel type has shown that the mechanical strength and tendency of this gel to be syneresized is sensitive to the physical and chemical parameters of the storage layer. Among these, the rapid degradation of the developed organic hydrogels was caused by total salinity above TDS=5 g/dm$^3$, pH below 5, temperatures above 100° C., or by acid solutions used in well pre-treatment, and mixing with isopropyl alcohol containing water used for dewatering the well area before treatment. As a result, the prior art process based on the in-situ formation of an impermeable barrier with organic hydrogel could only be used to stimulate gas production wells under conditions of low salt, mildly acidic or alkaline pH and low to medium temperature storage layers. Thus, the applicability of the developed phase inverse colloidal dispersion system was limited to a rather narrow range of most of the layer parameters. Due to the limited applicability of the developed procedure and hence the risk of higher costs, the company has stopped further well treatment experiments. Thus, it has become necessary to develop a new composition for a broader layer parameter range which, while retaining the advantageous properties of the prior version, is capable of providing a substantially more stable barrier in the reservoir and, due to the non polar character of its external phase, capable of blocking or limiting water inflow into the well.

It is noteworthy that the preparation and structural analysis of multicomponent self-assembled hydrogels in the hydrocarbon storage layer, within the parameters present therein, is one of the new, intensively developing fields of material structure research. Therefore, the scientific knowledge required for production processes for practical purposes is not yet fully available. For the time being, semi-empirical methods have been used to reveal the relationships between the composition and the properties of the gel. This is especially true for organic hydrogels, for which no reliable scientific knowledge has been found in the literature.

The effectiveness of research and development was also impeded by the fact that the formulation experiments based on the needed new, commercially available surfactants that can effectively be used for waterproofing in wider reservoir parameter range, which are suitable for forming structured, high viscosity barriers, and capable of phase inversion, said surfactants being based on the systematic, routine exchange of surfactant components selected for the development of a colloidal dispersion system composition, or the production of other weight ratio variants, or surfactants of other chemical types belonging to the wider HLB range, or other organic solvent compositions have not been successful so far.

Figure 4:
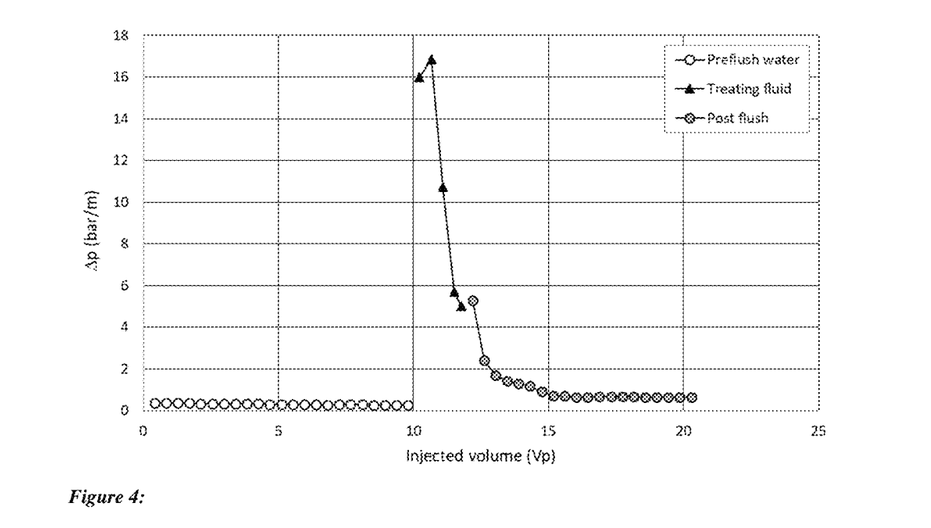
FIG. 4: Injection pressure of colloidal dispersion system suitable for phase inversion recommended as a fluid formulation according to Example P-15) (stable barrier formulation, the composition according to the invention)

The breakthrough towards efficiency was achieved by randomly applying an experimental plant oil reaction product-based product compound family and thus, after injection, in the reservoir, changing the composition of the structured, high-viscosity barrier composition and improving the application properties unexpectedly. unexpectedly increased physical, chemical, and thermal stability of the structured, highly viscous, organic hydrogel based barrier, With the new composition, layer-injected organic phase-inverse colloidal dispersion system and phase-inversion following the mixing of said colloidal dispersion system with various saline content layers water, a structured, highly viscous, organic hydrogel based barrier with unexpectedly increased physical, chemical, and thermal stability was prepared. During the optimization experiments of the composition with the new components, it has also been demonstrated that this hydrocarbon-based composition suitable for the construction of extremely stable barriers in hydrocarbon storage layers selected in previous applications can be successfully used in a larger parameter range than previously both for water exclusion barrier formation and for the mobilization and extraction of adsorbed residual crude oil in well proximity. The stability of the in-situ barrier is characterized, among other things, by a 90% reduction in the mobility of the bed water from the original value (the so-called memory effect, the mobility of the remaining bed water) even after pressing very large amounts of post-flush water (FIG. 4).

The unexpected outstanding use properties of the organic-based colloidal dispersion composition suitable for phase-inversion according to the present invention are thus attributable to the random use of a family of additives selected by lucky component selection and an internally developed gel stabilizing agent together. The development of the synthesis and application method of the vegetable oil and polyalkylene glycol and vegetable oil and/or polyalkanolamine amine type, multi-component reaction products used in the novel composition according to the present invention is therefore not at all achievable by routine activities of one of ordinary skill in the art, since in the new composition, which is different from the chemical composition of the components of the prior art compositions based on the use of exclusively known components, such beneficial effects of the compounds with novel chemical structure and function could not be expected.

BRIEF DESCRIPTION OF THE INVENTION

1. The composition according to the present invention prepared for the exclusion of water, said composition based on a colloidal disperse system suitable for phase inversion, with the new components, comprises based on the total weight of the composition
    a) from 60 to 90% by weight, preferably 70-80% by weight refined petroleum-distillation middle distillate having density in the boiling range of 140–240° C., preferably 180-220° C. $d^{20}4=0.77$-$0.79$ g/cm$^3$, and having Watson characterization factor of $K_w=11.6$-$12.2$, preferably 11.8 to 12.0,
    b) from 2% to 12% by weight of known anionic surfactants or mixtures of such surfactants,
    c) from 1 to 25% by weight of a known non-ionic surfactant of the fatty acid polyethylene glycol ester type having a water number of 5 to 8,
    d) from 1 to 25% by weight of a vegetable oil, preferably sunflower oil or rapeseed oil and an organic compound having at least two free hydroxyl groups and at least one intramolecular oxygen and/or nitrogen atom, preferably a reaction product of polyalkylglycol and polyalkanolamine having an average molecular weight less than $M_w=650$, said reaction product having a water number of from 3 to 12, preferably from 5 to 9, and having an unreacted vegetable oil content of up to 35% by weight.

The composition is a homogeneous colloidal solution, which, as appropriate, may contain from 1 to 4% by weight of other additives known in the oil industry.

2. The composition of Item 1, wherein the anionic surfactant is selected from the group consisting of an alkali metal salt of a linear alkyl chain alkylbenzene sulfonic acid, or an alkali metal salt of an alpha-olefin sulfonic acid having an average number of carbon atoms from 10 to 16 carbon atoms, or alpha-alcohol ether sulphate having a number of carbon atoms from 10 to 14 or any mixture thereof.

3. The composition of Item 2, wherein the anionic surfactant is selected from the group consisting of dodecylbenzene sulfonate Na salt, lauryl ether sulfonate Na salt, alpha olefin sulfonate Na salt, and di-dodecylbenzene sulfonate Jeffamine salt, or any mixture thereof.

4. The composition according to any one of the preceding Items, wherein the nonionic surfactant is selected from the group consisting of fatty acids with an average carbon number of from 14 to 20 and fatty acid esters prepared by the reaction of polyethylene glycols or polyalcohols having an average molecular weight of $M_n=200$-$650$, preferably $M_w=300$, or any mixture of these.

5. The composition of Item 4, wherein the nonionic surfactant is selected from the group consisting of elain PEG ester, sorbitan monooleate, fatty alcohol lauryl ether, fatty alcohol polyglycol ether, polyethoxylated sorbitan laurate, and nonylphenol polyethoxylate, or any mixture of these.

6. The composition according to any one of the preceding Items, wherein the organic compound forming the reaction product according to component d) is an organic polyol having an average molecular weight $M_w=200$-$650$, preferably $M_w=300$, or a polyalkanolamine or glycerol oligomer, or any mixture of these.

7. The composition according to Item 6, wherein the organic polyol is polyalkylene glycol or a block copolymer of polyalkylene glycols, preferably polyethylene glycol, polypropylene glycol, more preferably PEG 200 or PEG 300.

8. The composition of Item 6, wherein the polyalkanolamine is diethanolamine or triethanolamine.

9. The composition of Item 6, wherein the glycerol is an oligomer diglycerol or triglycerol.

10. A chemical stimulation method for reducing the proportion of water in production wells and/or controlling flow profiles in the vicinity of the water injection wells, said process comprising the step of injection of the composition according to Items 1 to 9 into a production well or a water injection well.

11. The process according to the preceding Item, wherein the production well and/or water injection well is a sandstone reservoir, carbonate reservoir or double porosity carbonate reservoir.

CAPTIONS OF FIGURES

FIG. 1: Visual representation of the microemulsions formed from the composition of the invention as a function of water content FIG. 2: Viscosity of emulsions prepared with a treatment solution containing the composition of Example P-15 at 50° C.

DETAILED DESCRIPTION OF THE INVENTION

Based on a wide selection of the starting materials, it has been found that compounds belonging to the following material groups can be advantageously used to produce a barrier of appropriate strength:

The petroleum medium distillate is the highest mass fraction component of the colloidal disperse system composition suitable for phase inversion, which is a predominantly saturated, narrow boiling fraction produced by the de-aromatization finishing refinement, containing predominantly paraffinic chain hydrocarbons. This is supported by the narrow boiling range of 140-240° C., preferably 180-220° C., of the distillate, said boiling range being is favourable for barrier formation, as well as by $K_w$=11.6-12.2, preferably 11.8-12.0 factor, characterizing its paraffinic character. $K_w$ stands for the Watson characterization factor calculated from distillation curves and density data and suitable for the characterization of crude oil and petroleum products. For more information on the characterization factor, see GARY, James H.; HANDWERK, Glenn E.; KAISER, Mark J. Petroleum refining: technology and economics. CRC press, 2007.

As anionic surfactant is preferably a commercially available alkali metal salt of a linear alkyl chain alkylbenzene sulfonic acid, or an alkali metal salt of an alpha-olefin sulfonic acid having on average from 10 to 16 carbon atoms, or an alpha alcohol ether sulfonate having from 10 to 14 carbon atoms, or a mixture of surfactants of similar chemical structure, including, but not limited to, dodecylbenzene sulfonate Na salt, lauryl ether sulfonate Na salt, alpha olefin sulfonate Na salt and di-dodecylbenzene sulfonate Jeffamine salt, is used.

As nonionic surfactants, commercially available fatty acid esters prepared by reacting commercially available fatty acids having an average carbon number of from 14 to 20 and polyethylene glycols or polyalcohols having an average molecular weight of $M_n$=200-650, preferably $M_n$=300, including but are not limited to: elain-PEG ester (Komad 704), sorbitan monooleate (Span-80), fatty alcohol lauryl ether (Genapol L3), fatty alcohol polyglycol ether (Hostacor 323), polyethoxylated sorbitan laurate (Tween 20), and nonylphenol polyethoxylate.

The third group of components having the function of gel-stabilizing, which is of high importance for high barrier stability includes vegetable oil, preferably rapeseed oil and/or sunflower oil and an organic polyol having $M_n$=200-650, preferably $M_n$=300, with at least two free hydroxyl groups and at least one inter-chain oxygen or nitrogen, preferably a polyalkylene glycol or a block copolymer of polyalkylene glycols, among them preferably polyethylene glycol, polypropylene glycol, e.g. PEG 200, PEG 300, and/or polyalkanolamines, preferably diethanolamine or triethanolamine, or glycerol oligomers such as diglycerol or triglycerol.

Examples of vegetable oils of the present invention include, without limitation, rapeseed oil, sunflower oil, olive oil, palm oil, soybean oil, coconut oil and the like, and mixtures thereof. Preferably, vegetable oils are products obtained by pressing large quantities of rapeseed and less sunflower seeds in Hungary, in the composition of which e.g. palmitic acid having 16 carbon atoms constituting rapeseed oil, and oleic acid having one unsaturated bond and 18 carbon atoms, α-linolenic acid having three double bonds, and linoleic acid containing a two double bonds is also found. In addition to the main components, these vegetable oils may contain omega-3, omega-6 and omega-9 fatty acid derivatives, as well as phosphoric acid lipids and free fatty acids. The average composition of rapeseed oils is as follows: 18:1 oleic acid: 62% by weight, 18:2 linoleic acid: 20% by weight, 18:3 α-linolenic acid: 9-10% by weight, 16:0 palmitic acid: 3-4% by weight, 18:0 stearic acid: 2% by weight, other unsaturated trans fatty acids: 4% by weight. In the above list, the designation before the names of the compounds indicates the number of double bonds in the given carbon chain. In the process for the preparation of the gel stabilizer product group, to the vegetable oil preferably sunflower oil and/or rapeseed oil base material the vegetable oil/polyol reagents are added in a temperature range of from 15 to 60° C., preferably from 15 to 30° C. in a molar ratio of 0.3 to 2.0, preferably 0.5 to 1.8, more preferably 0.7 to 1.4 (based on the total free and ester bonded carboxylic acid content calculated from the average molecular weight of the starting material vegetable oil), and then 0.2 to 3% by weight, preferably 0.2 to 1.0% by weight, of potassium or sodium hydroxide is added to the mixture, and then the mixture is reacted at a temperature of 140 to 200° C., preferably 150 to 180° C., for 1 to 12 hours, preferably 3 to 8 hours, with constant stirring. The reaction mixture is then cooled to room temperature. The composition of the gel stabilizer thus prepared is checked by determination of its water number and its content of unchanged vegetable oil by gel chromatography. The product of suitable quality has a water number of from 3 to 12, preferably from 5 to 9 and an unreacted vegetable oil content of up to 35% by weight. The vegetable oil used in the preparation of component d) according to the invention also participates with its hydroxyl groups in reactions with the organic compound containing at least two free hydroxyl groups and at least one inter-chain oxygen and/or nitrogen atom, resulting in a mixture of products consisting of structurally diverse, low-concentration, wide variety of compounds that are hardly identifiable and are barely distinguishable even by very meticulous analytical methods. Our observations demonstrate that the narrow range of mass ratios of the compounds with various molecular structures of the reaction mixture and thus the reproducibility of the preparation as well as the appropriate proportions of the hydrophobic and hydrophilic functional groups can be ensured by the accurately measurable water numbers and limiting unreacted vegetable oil concentrations.

The water-number assay is used to determine the hydrophilic-lipophilic nature of surfactants and may provide insight into the degree of efficacy of the emulsifier and whether hydrophilic or oleophilic groups predominate in the surfactant. More information can be found in VERDINELLI, Valeria, et al. Hydrophile-lipophile balance (HLB) of n-alkane phosphonic acids and theirs salts. Colloids and Surfaces A: Physicochemical and Engineering Aspects, 2008, 316.1-3: 131-135.

In the context of the present invention, the term "flow profile control" refers to artificial/conscious intervention to compensate the selective flow profile influenced by rock heterogeneity in the vicinity of the production and water injection wells.

Not suitable for technologies where gel formation and/or polymerization is carried out using pre-use specific (non-in situ) technology and the injection does not take place into production and water injection wells, but rather in hydrocarbon industry research and exploration wells, in drilling and fracturing processes.

In the context of the present invention, the term "water proportion reduction" means the application of a layer treatment method which results in a reduction in the amount of water production, which may initially be up to 98% in oil production wells, and said process results in 5% to 60% water proportion reduction. Compared to the prior art, the present invention reduces the water content through stable spontaneous barrier formation.

The method of the invention is applicable to sandstone reservoirs, carbonate reservoirs and dual porosity carbonate reservoirs.

For the purposes of the present invention, "sandstone reservoir" is a porous rock containing hydrocarbons, the major component of which is silicate minerals having a porosity of 5-40% and a permeability of 10-5000 mD. The amount of acid-soluble carbonate rocks (consolidating minerals) in sandstone deposits is also significant, their concentration ranging from 5 to 40%, preferably from 10 to 25%.

In the context of the present invention, a "carbonate reservoir" is a hydrocarbon-containing, fractured, cavernous or double-porous rock, the major component of which is constituted by acid-soluble minerals, predominantly calcite and dolomite, in a concentration of 50-80%.

In the context of the present invention, "dual porosity carbonate reservoir" is a carbonate reservoir which pore space is largely composed of fractured and/or caverns, with a minor portion of the matrix porosity.

By using preferably selected members of the above described component groups and determining their optimum weight ratios, a targeted composition according to the invention may be prepared, said composition being adapted to the products of the well selected for treatment, in particular gas and/or petroleum wells, and the properties of the storage rock and bed water.

Our observations have shown that when the colloidal dispersion system composition of the present invention suitable for phase inversion is mixed with the bed water of petroleum or natural gas wells, the water content of the system reaches the 3 to 10% by weight concentration, which is required to form a barrier, then it transforms spontaneously in a wide temperature range to a high viscosity, structured, high viscosity barrier. The barrier formed from the composition of the present invention when mixed with the bed water is preferably in the form of a hydrogel, therefore in the following the term "hydrogel" is used interchangeably with the term "high viscosity barrier" without limiting the possible meaning of the term barrier to hydrogels. Studies of real reservoir rock cores have shown that mixing of the bed waters in the pores of the reservoir with the composition of the present invention resulted in the formation of the same type of hydrogel, which also impeded the flow of water as a barrier, while the hydrocarbon present in the reservoir may slightly diffuse, depending on the size and chemical structure of said hydrocarbon. The resulting hydrogel structure acts as a barrier to water inflow up to a water content of 20-40% by weight, required to maintain stability the formed hydrogel structure, and only at higher water mixing rates will the barrier convert into a low-viscosity, water external phase macroemulsion. However, due to the length of the pore channels of the storage rock and the time required to transport the material associated with the barrier-degradation, the complete degradation process may take even several years.

Figure 5:
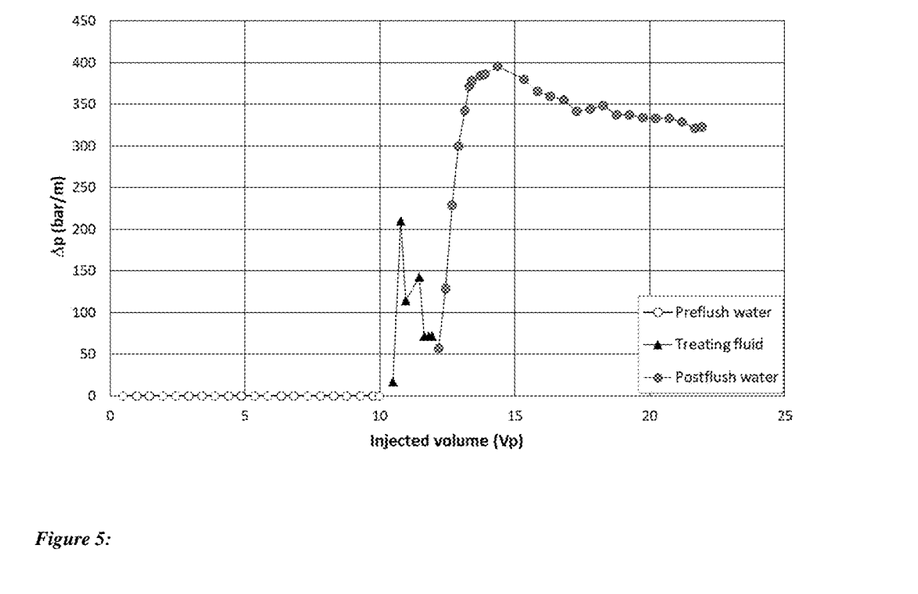
FIG. 5: Injection pressure of colloidal dispersion system suitable for phase inversion using the composition according to Example Pr-1; (unstable barrier formation, reference composition)

The above findings are confirmed by flow tests at bed temperature with treatment liquids of 9 $g/dm^3$ saline content. FIG. 4 shows the result of a flow experiment with a composition according to the present invention (Example P-9, the composition to be described later) in a natural porous medium. By way of comparison, FIG. 5 shows the result of an experiment with a treatment fluid other than the composition of the present invention having a composition according to the state of the art (Example Pr-1, the composition of which hereinafter described). FIG. 4 shows a typical injection pressure as a function of the injection volume during a flow experiment with a treatment liquid containing the composition of Example P-9. As it can be seen in the Figure, during the initial water injection, the pressure gradient is extremely small, up to 2-3 bar/m. In contrast, at the forefront of the microemulsion formed from the colloidal dispersion system suitable for phase inversion, mixed with the bed water, an extremely elevated pressure is experienced, and at the backfront it is substantially stabilized at 300-350 bar/m after the barrier formation. The double barrier system does not change significantly even when large volumes of water are injected, i.e. stable resistance to the flow of water is created, which is a good guarantee for the long-term, efficient water exclusion in the storage systems and for the reduction of water proportion in gas producing wells.

FIG. 5 shows the result of a flow experiment with a similar injection protocol. In this case, however, injection was made with a treatment fluid according to the prior art composition (treatment liquid containing composition Pr-1). It can be seen that at bed temperature, stable barrier formation is almost completely absent, i.e. the prior art composition is completely unsuitable for barrier formation at bed temperature and to reduce the water yield of production wells.

Figure 6:
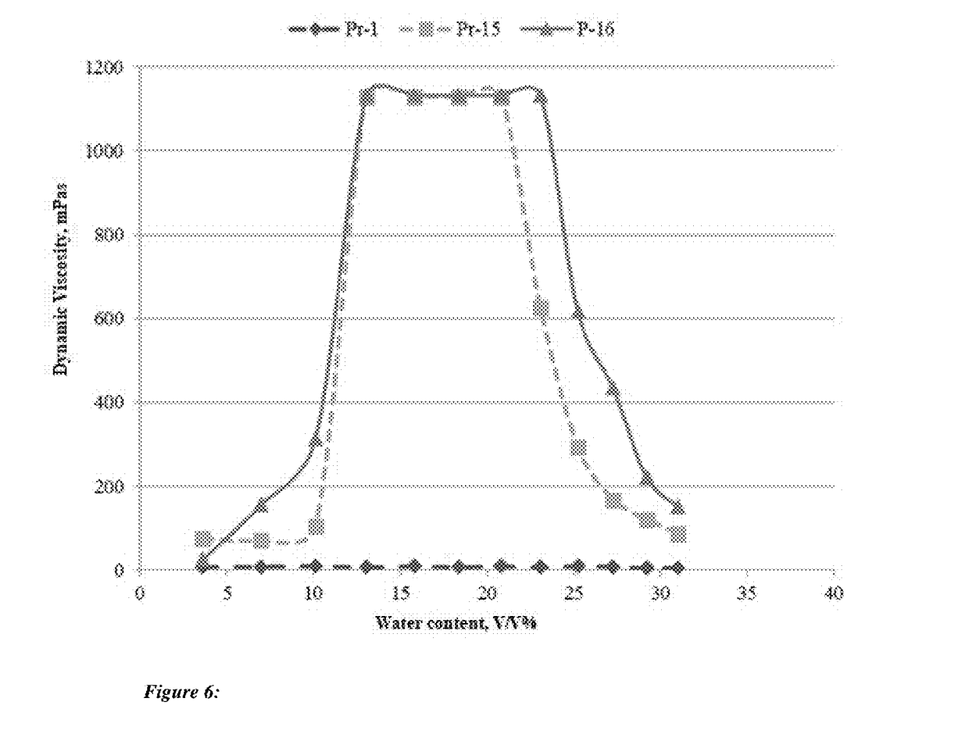
FIG. 6: Dynamic viscosity of gels made with inventive and reference compositions and bed water containing TDS=20 g/dm$^3$ salt as a function of the water content of the gel (Test conditions: T=80° C., η=80 l/s, Brookfield DV-III Ultra rotation viscometer)
Figure 7:
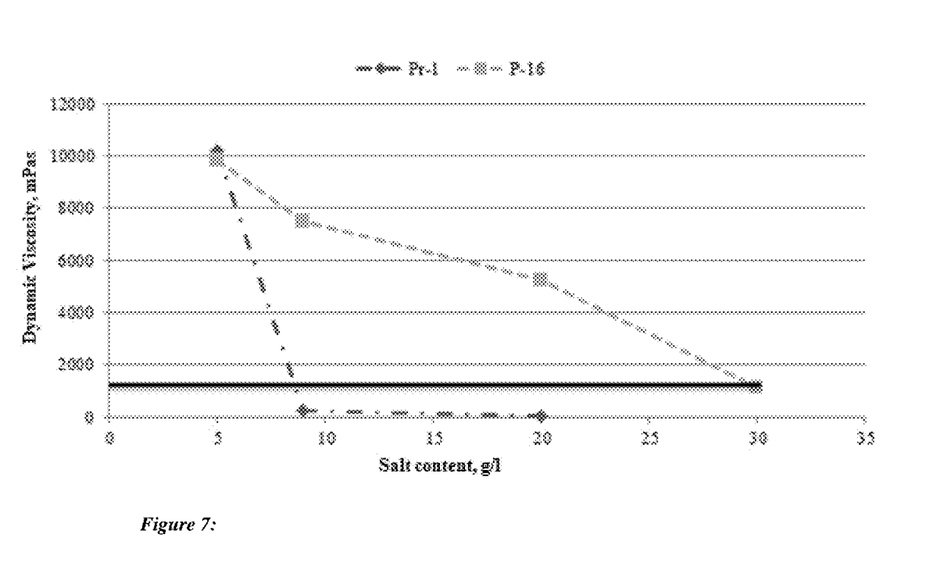
FIG. 7: Effect of salinity on gel stability

Studying the application properties of the composition of the present invention, it has been surprisingly found that the stability of the novel formulation barrier forming material against the destructive effects that damaged the various previously used barrier structures has unexpectedly improved (see FIGS. 6 and 7). In particular, the salt tolerance was increased, whereby the upper salt concentration limit of about 5 $g/dm^3$ of the previous composition was increased to 30 $g/dm^3$. In addition, the upper temperature limit of stability was increased from 100° C. to 120° C., and the maximum dynamic viscosity of the hydrogel form barrier (at 8/sec shear rate gradient and 80° C. and 20 $g/dm^3$ salt content) were increased from 10.4 mPas to 1130 mPas. The water content range belonging to 1100 mPas viscosity of the viscosity versus water content relationship curve, which characterises the barrier strength, increased from 5.3% to 12.2% by weight (see FIG. 8). This increase in water uptake capacity can extend the life of a gel-based water barrier by about 50%.

The new level of efficacy of the composition according to the invention is also indicated by the fact that with compositions other than the composition according to the present invention no barrier of appreciable stability can be obtained when using salty bed water containing 10 $g/dm^3$ of salt. The new composition also had a significant decrease in pH sensitivity, which resulted in a lower applicability limit for the bed water containing the composition from pH=6 to pH=4, indicating that sufficiently strong even hydrogels can be produced even in the slightly acidic pH range. The qualitative selection of the organic hydrogel formulations prepared in the laboratory was carried out in the following order, based on the experience of previous practical application experiments and the following impact assessment characteristics.

1. The first screening test was based on the solubility measurement of the components of the gel-forming compositions. If any of the potential components were not or only partially solubilized in the hydrocarbon middle distillate, which predominantly makes up the composition by weight, and when it is used, not any other component could promote said component's complete solubility, thereby causing the turbidity of the solution, this component had to be excluded from further formulation.

2. The second selection was carried out on the basis of characteristics determined in view of the operational experience of gel formation. A series of samples were prepared by mixing the experimental composition with the actual bed water in different proportions and the dynamic viscosity of the gels using an 8/sec shear rate gradient was measured. Using the data the water content versus viscosity curves were recorded. To characterize the strength of the gel, the range of water content of the metastable gel formed at the given viscosity values with the participation of the bed water as shown in FIG. 3 was read. During the evaluation, the water content range ($\Delta_{min,\ 100\%}$=5%) suitable for the high-strength barrier formation was determined based on the differences in the water contents belonging to the crossing points of the curve of 1100 mPas viscosity, while the minimum achievable water content range ($\Delta_{min,\ 100\%}$=10%) was determined based on the differences in the water contents belonging to the crossing points of the curve's half value, that is of 550 mPas viscosity, ($\Delta_{min,\ 100\%}$=10%).

3. In the third, final stage of the selection, measuring of the salt tolerance, and mechanical strength against other chemical agents and thermal storage stability of the gels prepared with the specific composition bed waters from compositions meeting the mechanical strength requirements (gel stability and composition analysis), furthermore, measuring of the permeability of the composition and the gel generated during the application of the composition on specifically used or model rock formations took place.

4. The limits of suitability established on the basis of the laboratory tests for the raw materials to be used and for the action characteristics of the synthesized gel stabilizers and the finished compositions are given in the relevant tables.

EXAMPLES

Commercially available refined petroleum middle distillates, anionic and nonionic surfactants, and as novel gel stabilizers the synthesized vegetable oil polyol and vegetable oil polyalkanolamine reaction products were used to prepare the exemplary compositions of the present invention. The data of the middle distillates and the synthesized gel stabilizers are summarized in Table 1. It is apparent from the data that the highest weight ratio of the compositions of the present invention is a predominantly saturated, narrow boiling point fraction produced by de-aromatization finishing refining process containing mainly paraffinic hydrocarbons. This is supported by the narrow boiling range of one distillate to form advantageously barrier and the $K_w$=11.9 characterizing factor characterizing its paraffinic character. The two middle distillates have been found to be equally useful for the construction of barriers, but the higher boiling point and therefore safer handling of Dunasol 180/220 has been found to be advantageous in practical applications.

TABLE 1

Hydrocarbon fractions and characteristics of vegetable oil-polyol reaction reaction products of the composition of the invention

| Characteristics of the component | Hydrocarbon middle distillate | | NA-DEA RT | NA-PEG RT | RO-PEG RT | RO-DEA RT |
|---|---|---|---|---|---|---|
| Trade designation | Dunasol 180/220 | Dula—C | — | — | — | — |
| Manufacturer | MOL Plc. | MOL Plc. | experimental | experimental | experimental | experimental |
| $d_4^{20}$, g/cm$^3$ (ASTM D 1298-12) | 0.775-0.795 | 0.761-0.788 | 0.88-0.93 | 0.88-0.93 | 0.88-0.93 | 0.88-0.93 |
| Starting boiling point, ° C. (ASTM D 86) | 180 | 135 | — | — | — | — |
| Final boiling point, ° C. (ASTAM D 86) | 220 | 210 | — | — | — | — |
| Kw (API Technical Data Book) | 11.9 | 11.8 | — | — | — | — |
| S content, ppm (ASTMD 1298-12) | max. 10 | max. 10 | — | — | — | — |
| Water number[1] | — | — | 5.8 | 6.8 | 6.5 | 8.9 |
| Quantity of unchanged vegetable oil, area %, GPC[2] | — | — | 20 | 28 | 23 | 33 |

1 Method for the determination of water number: The assay is used to determine the hydrophilic-lipophilic nature of surfactants and was developed by Greenwald, Brown and Fineman (P. Becher, Emulsions, MK Bp., 1965). Weigh 1 g of the material to be tested on an analytical balance and dissolve in 30 cm$^3$ of a previously prepared mixture of cyclohexane dioxane (4% cyclohexane content). The sample thus prepared is then titrated with distilled water until no permanent turbidity is observed. The number of cm$^3$s of distilled water required for turbidity indicating the end of the titration gives the water number of the test material.

2 Determination of unconverted vegetable oil concentration: GPC assay. The maximum value of this in the composition of the reaction product is 35% by weight according to the invention. Measurement conditions: solvent (eluent): tetrahydrofurane; solvent flow rate: 1 cm$^3$/min; temperature: 35° C.; columns used for separation: Ultrastyragel 10000 A, 1000 A, 100 A pore diameter columns in series, RI detector.

The gel stabilizers described in Table 1 were prepared by reacting NA industrial grade sunflower oil or RO rapeseed oil or a mixture of NO different types of vegetable oils and various polyol compounds using alkaline catalysts. This involves mixing the vegetable oil starting material in a heated stirred reactor at 25° C. with the selected polyol reagent or mixture thereof and the inorganic alkali catalyst. The reactants of the starting vegetable oil and polyol were reacted in the presence of inorganic alkali, preferably KOH or NaOH catalyst in an amount of 0.5 to 1.8, preferably 0.7 to 1.4, molar proportion referred to the average molecular weight of the vegetable oil, based on the free and ester bonded total carboxyl group, at a temperature of 140 to 200° C. for a period of 1 to 12 hours, preferably 2 to 8 hours. The reaction mixture is then cooled to 15-30° C. and placed in a container.

Under the operating conditions used, partial transesterification or amide formation reactions of the vegetable oil result in the formation of new amide- and/or ester-linked compounds containing one or more free hydroxyl groups.

In the efficacy studies of the experimental compositions, selected real or artificial realistic model bed water samples were used in the wide salinity range (TDS=3-30 g/dm$^3$) of the most commonly occurring hydrocarbon mining bed waters (Table 2).

TABLE 2

Characteristics of bed water used for efficacy assessments

| Designation of the bed water | Origin | Total salt content (TDS), g/dm$^3$ | Na-content, ppm | Chloride content, ppm | pH |
|---|---|---|---|---|---|
| MoV-1 | Algyő-field | 5.0 | 1164 | 417 | 8 |
| MoV-2 | artificial model water | 9.4 | 3 800 | 5 000 | 5.3 |
| MoV-3 | artificial model water | 20.0 | 7 600 | 11 210 | 5.5 |
| MoV-4 | artificial model water | 30.1 | 11 070 | 16 310 | 5.6 |
| Distilled water | distilled water | 0 | 0 | 0 | 7 |

Table 3 summarizes the types of surfactants and gel stabilizers used in the working Examples.

Table 4 summarizes the utility properties of the reference products (Examples Pr-1 and Pr-2) suitable for low salt content (up to g/dm$^3$) bed water according to the state of the art, and Pe-4, Pe-5, Pe-6, Pe-7, Pe-8 counter examples produced in the first stage of the development of the present invention, and exemplary composition P-9 according to the invention. The experiments were performed on a 7 cm long natural sandstone core at 80° C. operating temperature by sequential injection of a total of 20 Vp of bed water and 2 Vp of the composition according to the invention.

In the study of the effect of the experimental compositions, the structural stability of the formed structured, high-viscosity barriers was assessed by the width of the water-content ranges belonging to 1100 mPas es 550 mPas viscosities readable from characteristic curve of the relationship between the dynamic viscosity of the hydrogels and the water content. The gel should, as far as possible, maintain the stable waterproof barrier formed from it, as wide water-content range as possible, in the pores of the rock. Due to the fluid flows in the reservoir and the pressure difference during recovery, the barrier will slowly lets water in, disintegrate and will emerge in the produced material during production of the well. Thus, the wider the metastable water content range of the barrier hydrogel, the longer it can perform its water barrier function. When comparing the data in Table 4, it was also found that compositions in case of low salt content bed water, the compositions meeting the barrier forming requirements, according to currently known technical knowledge (Examples Pr-1 to Pr-2 and Pe-6) can be prepared with similar surfactants those known ones, or with a gel stabilizer according to the invention. Thus, with a low salt content, within the margin of error, the composition of the present invention (P-9) is as effective as the prior art compositions.

TABLE 3

Characteristics of the commercially available surfactant products and experimental surfactants according to the invention used in the compositions of the working Examples

| Designation of the surfactant | Chemical type | Type of surfactant | Origin |
|---|---|---|---|
| DBS | Dodecyl-benzene-sulfonate-Na salt | anionic | commercial |
| LES | Lauryl-ether-sulfate-Na salt | anionic | commercial |
| AOS | Alfa olefin-sulfonate-Na salt | anionic | commercial |
| GE | Di-Dodecyl-benzenesulfonate-Jeffamin salt | anionic | commercial |
| Tween-20 | Sorbitane-monooleate | nonionic | commercial |
| KOMAD-704 | Elain-PEG-300 ester | nonionic | commercial |
| Elain-PEG-200É | Elain-PEG-200 ester | nonionic | commercial |
| Elain-PEG-600É | Elain-PEG-600 ester | nonionic | experimental |
| Genapol L3 | Fatty alcohol-lauryl ether | nonionic | commercial |
| Hostacor 323 | Fatty alcohol-polyglycol ether | nonionic | commercial |
| NO-PEG-300 RT | Mixed vegetable oil PEG-300 reaction product | nonionic gel stabilizer | experimental |
| RO-PEG-300 RT | Rapeseed oil-PEG-300 reaction product | nonionic gel stabilizer | experimental |
| NA-PEG-300 RT | Sunflower oil PEG-300 reaction product | nonionic gel stabilizer | experimental |
| NA-PEG-200 RT | Sunflower oil PEG-200 reaction product | nonionic gel stabilizer | experimental |
| NA-DEA RT | Sunflower oil-diethanolamine reaction product | nonionic gel stabilizer | experimental |
| RO-TEA RT | Rapeseed oil triethanolamine reaction product | nonionic gel stabilizer | experimental |
| RO-DEA RT | Rapeseed oil-diethanolamine reaction product | nonionic gel stabilizer | experimental |

TABLE 4

Examples of hydrocarbon solubility of the components of the composition and selection of the components of the composition based on the mechanical strength (MoV-1 Layer Water TDS = 5 g/dm$^3$)

| Characteristics | Pr-1 | Pr-2 | Pr-3 | Pe-4 | Pe-5 | Pe-6 | Pe-7 | Pe-8 | P-9 |
|---|---|---|---|---|---|---|---|---|---|
| Composition, weight % | | | | | | | | | |
| Dunasol 180/220 | 80 | 80 | 80 | 80 | 80 | 78 | 80 | 78 | — |
| Dula-C | — | — | — | — | — | — | — | — | 79 |
| DBS | 2 | 0 | 1 | 2 | 2 | 2 | 2 | — | 2 |
| LES | 3 | 5 | — | 3 | 3 | 3 | 3 | 7 | 3 |
| AOS | — | — | 4 | — | — | — | — | — | — |
| GE | — | — | — | — | — | — | — | 2 | — |
| KOMAD 704 | 15 | 15 | — | — | — | 15 | — | 11 | 14 |
| Tween 20 | — | — | — | 15 | — | — | — | — | — |
| ELAIN-PEG-200É | — | — | — | — | 15 | — | — | — | — |
| Genapol-L3 | — | — | — | — | — | 2 | — | 2 | — |
| Elain-PEG-600É | — | — | — | — | — | — | 15 | — | — |
| NO-PEG-300RT | — | — | 15 | — | — | — | — | — | 2 |
| Solubility of components | T | T | T | Z | Z | T | FSZ | FSZ | T |
| Strength of the gels | | | | | | | | | |
| $DV_{80°\,C.}$ = at 1100 mPas $\Delta V$, % by weight $\Delta V_{min}$ = 5 by weight | 11.5 | 16.0 | 17.3 | — | — | 15.2 | — | — | 12.7 |
| $DV_{80°\,C.,\,50\%}$ = 550 mPas $\Delta V_{50\%}$, % by weight $\Delta V_{50\%,\,min}$ = 10% by weight | 14.5 | 21.0 | 22.1 | — | — | 19.5 | — | — | 18.5 |

P: compositions of the invention
Pr: previously developed reference compositions
Pe: a compositions other than those according to the invention
$\Delta V_{°\,C.}$ a $DV_{80°\,C.}$ = water content range of gels with viscosity over 1100 mPas
$\Delta V_{min}$: range of minimum water content of gel formation
T: total solubility
Z: cloudy with partial solubility
FSZ: phase separation, insoluble In Table 5, the strength properties of gels prepared using the reference composition (Example Pr-1) and counter-examples (Pe-10, Pe-11, Pe-14) other than the composition of the invention, and the inventive compositions (Examples P-12, P-13, P-15 and P-16) using various salt-containing bed water can be compared. The measurement data well illustrate the order of magnitude differences in gel strength between gels according to the prior art and compositions containing new gel stabilizer components. The state of the art Pr-1 exemplary reference composition and bed water of TDS=9.4 g/dm$^3$ salt content no longer produced a stable gel because of its dynamic viscosity of only $DV_{80°\,C.}$=220 mPas. Only the additional use of the new gel stabilizers could achieve the required gel stability (Examples P-12, P-13). The same could be stated with gels prepared with compositions according to reference formulations according to counter examples Pr-1 and Pe-14 containing bed water of TDS=14 g/dm$^3$ salt gels, the viscosity of which could not be increased above 70 mPas even with the addition of other additional surfactants. In contrast, the gel strength was increased to the appropriate level by using a gel stabilizer and changing the weight ratio of the components (Example P-15).

With the TDS=20 g/dm$^3$ salt content bed water, the previously developed reference composition Pr-1 no longer achieved a gel-like state ($DV_{80°\,C.}$=10 mPas). In this case, however, in addition to the LES anionic and KOMAD-704 non-ionic surfactants, the gel prepared with two different gel stabilizers (NA-PEG-300-RT and RO-DEA-RT) was already stable (Example P-16) at usage requirements.

Figure 8:
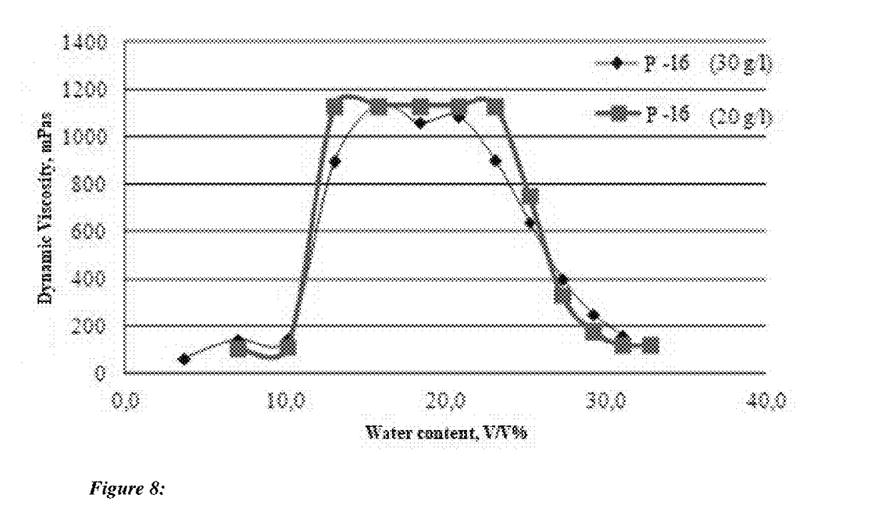
FIG. 8: Viscosity as a function of water content of high salt gels prepared with the composition according to Example P-16.

Thus, the use of the novel gel stabilizer type of the present invention has resulted in an unexpected, technically significant increase in stability. Such an increase in salt tolerance is illustrated by the dynamic viscosity-water content curves in FIG. 6 and FIG. 7, and the in FIG. 8, the change of the $DV_{80°\,C.}$ dynamic viscosity of the gels prepared with the composition according to the present invention and Pr-1 reference example as a function of the TDS salt content of the bed water used for the preparation of the gel. FIGS. 7 and 8 illustrating the relationship between the dynamic viscosity and water content of a gel prepared with the composition of Example P-16 and with a salt water content of TDS=30 g/dm$^3$ show further potential for increasing salt tolerance. Note that FIGS. 2 to 4 are in fact fracture curves, since the viscosity in the phase inversion range can also exceed 5000-8000 mPa s, which is outside the measuring range of the rheometer T-C probe. Therefore, the DV max. was determined using a T-F probe. As for the mobility of the test samples in porous media, it is noted that the trends in the computed data are mirror images of the viscosity curves, which means that the mobility of the fluids decreases by orders of magnitude as the water content increases.

Considering that most hydrocarbon reservoirs have a significantly higher salinity than TDS=5 g/dm$^3$, the new composition is much more important than the previously developed salinity-sensitive treatment fluid. Thus, the present invention has solved a technical problem that has not been solved so far that, due to the reproducibility of the composition, no contamination to the water quality of the reservoir layer remains after application. Because the composition is based on biodegradable vegetable oil derivatives, their use in surface technology is less environmentally burdening than similar methods using normally more hazardous chemicals.

In the experimental use of the composition according to the invention, the well is first dried by injection of an inert gas, preferably nitrogen, and/or a water-miscible organic solvent, preferably isopropanol, prior to well treatment. Thereafter, the treatment composition is pressed continuously or sequentially into the storage layer, depending on the parameters of the container. To facilitate the formation of a hydrostructured, high viscosity barrier, the well was rested for 20-70 days, preferably 30-50 days, and then slow programmed recovery in the direction opposite the well injection was started. The emulsion liquid products of the initial yield were subjected to emulsion decomposition. As a special advantage of the treatment methods, it was found that the composition was able to produce the accumulated and adherent residual oil in the well area, which dispersed into the treatment liquid in the form of emulsion results in excess oil recovery after restarting the operation of the well goes to the collecting station and is worked up. This effect, which results from the strong bed-cleaning properties of the composition, is particularly advantageous in the so-called "overhead" field above the abandoned oilfields for cultivating gas cap fields. In addition, due to the nature of the technology used, the well will not be lost even in the event of a failed treatment, as by recovery all the injected organic material may even restore the well to its original state. Field experiments have shown that the desired effect is not achieved in the treated layer when the technical specifications (composition) according to the invention are reduced.

the range of 140-240° C., density $d^{20}_4$=0.77-0.79 g/cm³, and Watson characterization factor of $K_w$=11.6-12.2 b) from 2 to 12% by weight of an anionic surfactant or mixtures of such surfactants, c) from 1 to 25% by weight of a non-ionic surfactant comprising a fatty acid polyethylene glycol ester having a water number of 5 to 8, d) from 1 to 25% by weight of a reaction product of sunflower oil or rapeseed oil and an organic compound having at least two free hydroxyl groups and at least one intramolecular oxygen and/or nitrogen atom, wherein the organic compound forming the reaction product is an organic polyol selected from the group consisting of polyethylene glycol, polypropylene glycol, a block copolymer thereof, polyalkanolamine, or glycerol oligomer, said organic compound having an average molecular weight less than $M_n$=650, said reaction product having a water number of from 3 to 12, and having an unreacted vegetable oil content of up to 35% by weight.

2. The composition according to claim 1, wherein the anionic surfactant is selected from the group consisting of an alkali metal salt of a linear alkyl chain alkylbenzene sulfonic acid, or an alkali metal salt of an alpha-olefin sulfonic acid having an average number of carbon atoms from 10 to 16 carbon atoms, or alpha-alcohol ether sulphate having a number of carbon atoms from 10 to 14 or any mixture thereof.

3. The composition according to claim 2, wherein the anionic surfactant is selected from the group consisting of dodecylbenzene sulfonate Na salt, lauryl ether sulfonate Na

TABLE 5

Strength characteristics of different compositions and gels prepared with bed waters of with various salinity

| Characteristics | Number of examples | | | | | | | | | | |
|---|---|---|---|---|---|---|---|---|---|---|---|
| | P-1r | Pe-10 | Pe-11 | P-12 | P-13 | Pr-1r | Pe-14 | P-15 | P-1r | P-15 | P-16 |
| | TDS = 9.4 g/dm³ | | | | | TDS = 14 g/dm³ | | | TDS = 20 g/dm³ | | |
| Composition, weight % | | | | | | | | | | | |
| Dunasol 180/220 | 80 | 79 | 78 | 80 | 80 | 80 | 79 | 79 | 79 | 79 | 80 |
| DBS | 2 | — | 2 | — | — | 2 | 2 | — | 2 | — | — |
| LES | 3 | 5 | 3 | 8 | 9 | 3 | 3 | 8 | 3 | 8 | 9 |
| KOMAD 704 | 15 | — | 15 | 8 | 9 | 15 | 15 | 8 | 15 | 8 | 2 |
| NO-PEG-300 RT | — | — | — | 4 | 2 | — | — | 4 | — | 4 | — |
| Genapol-L3 | — | — | — | — | — | — | — | — | — | — | — |
| SPAN-80 | — | 15 | — | — | — | — | — | — | — | — | — |
| Isopropyl alcohol % | | | | | | — | — | 1 | 1 | 1 | — |
| Hostacor 323 | — | 1 | 2 | — | — | — | 1 | — | — | — | — |
| RO-PEG-300 RT | — | — | — | — | — | — | — | — | — | — | 9 |
| Solubility of components | T | T | T | T | T | T | T | T | T | T | T |
| Strength of the gels | | | | | | | | | | | |
| $DV_{80°\,C.}$ = 1100 at mPas $\Delta V$, % by weight $\Delta V_{min}$ = 5% by weight | — | — | — | 10.0 | 10.0 | — | — | 7.7 | — | 7.7 | 12.0 |
| $DV_{80°\,C.,\,50\%}$ = at 550 mPas $\Delta V_{50\%}$, % by weight $\Delta V_{50\%,\,min}$ = 10% by weight | — | — | — | 15.5 | 14.0 | — | — | 11.7 | — | 11.7 | 17.5 |
| $DV_{min,\,1100\,mPas}$ | 220 | 806 | 77 | >1100 | >1100 | 68 | 37 | >1100 | 10 | >1100 | >1100 |

What is claimed is:

1. A composition based on a colloidal disperse system suitable for phase inversion, said composition comprising:
   a) from 60 to 90% by weight of refined petroleum-distillation middle distillate having a boiling point in salt, alpha olefin sulfonate Na salt, and di-dodecylbenzene sulfonate Jeffamine salt, or any mixture thereof.

4. The composition according to claim 1, wherein the nonionic surfactant is selected from the group consisting of fatty acids with an average carbon number of from 14 to 20 and fatty acid esters prepared by the reaction of polyethylene glycols or polyalcohols having an average molecular weight of $M_n$=200-650, or any mixture thereof.

5. The composition of claim 4, wherein the nonionic surfactant is selected from the group consisting of elain PEG ester, sorbitan monooleate, fatty alcohol lauryl ether, fatty alcohol polyglycol ether, polyethoxylated sorbitan laurate, and nonylphenol polyethoxylate, or any mixture thereof.

6. The composition of claim 1, wherein the polyalkanolamine is diethanolamine or triethanolamine.

7. The composition of claim 1, wherein the glycerol is an oligomer diglycerol or triglycerol.

8. The composition according to claim 1, wherein the refined petroleum-distillation middle distillate has a boiling point in the range of 180-220° C.

9. The composition according to claim 1, wherein the refined petroleum-distillation middle distillate has a Watson characterization factor of $K_w$=11.8-12.0.

10. The composition according to claim 1, wherein said reaction product has a water number of from 5 to 9.

11. The composition according to claim 1, wherein the non-ionic surfactant is selected from the group consisting of fatty acids with an average carbon number of from 14 to 20 and fatty acid esters prepared by the reaction of polyethylene glycols or polyalcohols having an average molecular weight of $M_n$=300, or any mixture thereof.

12. A chemical stimulation method for reducing the proportion of water in production wells and/or controlling flow profiles in the vicinity of water injection wells, said method comprising:
  injecting into a production well or a water injection well a composition based on a colloidal disperse system suitable for phase inversion, wherein the composition comprises:
  a) from 60 to 90% by weight of refined petroleum-distillation middle distillate having a boiling point in the range of 140-240° C., density $d^{20}_4$=0.77-0.79 g/cm$^3$, and Watson characterization factor of $K_w$=11.6-12.2,
  b) from 2 to 12% by weight of an anionic surfactant or mixtures of such surfactants,
  c) from 1 to 25% by weight of a non-ionic surfactant comprising a fatty acid polyethylene glycol ester having a water number of 5 to 8,
  d) from 1 to 25% by weight of a reaction product of sunflower oil or rapeseed oil and an organic compound having at least two free hydroxyl groups and at least one intramolecular oxygen and/or nitrogen atom, wherein the organic compound forming the reaction product is an organic polyol selected from the group consisting of polyethylene glycol, polypropylene glycol, a block copolymer thereof, polyalkanolamine, or glycerol oligomer, said organic compound having an average molecular weight less than $M_n$=650, said reaction product having a water number of from 3 to 12, and having an unreacted vegetable oil content of up to 35% by weight.

13. The method according to claim 12, wherein the refined petroleum-distillation middle distillate has a boiling point in the range of 180-220° C.

14. The method according to claim 12, wherein the refined petroleum-distillation middle distillate has a Watson characterization factor of $K_w$=11.8-12.0.

15. The method according to claim 12, wherein said reaction product has a water number of from 5 to 9.

16. The method according to claim 12, wherein the non-ionic surfactant is selected from the group consisting of fatty acids with an average carbon number of from 14 to 20 and fatty acid esters prepared by the reaction of polyethylene glycols or polyalcohols having an average molecular weight of $M_n$=300, or any mixture thereof.

\* \* \* \* \*